(12) United States Patent
Werner et al.

(10) Patent No.: US 10,569,599 B2
(45) Date of Patent: Feb. 25, 2020

(54) VEHICLE WHEEL COMPRISING A WHEEL RIM AND A WHEEL DISC

(71) Applicant: THYSSENKRUPP CARBON COMPONENTS GMBH, Wilsdruff STT Kesselsdorf (DE)

(72) Inventors: Jens Werner, Coswig (DE); Christian Koehler, Dresden (DE); Sandro Maeke, Dohma (DE); Michael Dressler, Dresden (DE); Christian Heilmann, Dresden (DE); Florian Franke, Dresden (DE)

(73) Assignee: THYSSENKRUPP CARBON COMPONENTS GMBH, Wilsdruff STT Kesselsdorf (DE)

( * ) Notice: Subject to any disclaimer, the term of this patent is extended or adjusted under 35 U.S.C. 154(b) by 0 days.

(21) Appl. No.: 15/508,584

(22) PCT Filed: Sep. 8, 2015

(86) PCT No.: PCT/DE2015/100385
§ 371 (c)(1),
(2) Date: Mar. 3, 2017

(87) PCT Pub. No.: WO2016/037611
PCT Pub. Date: Mar. 17, 2016

(65) Prior Publication Data
US 2017/0253077 A1    Sep. 7, 2017

(30) Foreign Application Priority Data
Sep. 9, 2014   (DE) .................. 10 2014 112 980

(51) Int. Cl.
*B60B 23/08* (2006.01)
*B60B 23/10* (2006.01)

(52) U.S. Cl.
CPC .............. *B60B 23/08* (2013.01); *B60B 23/10* (2013.01); *B60B 2900/111* (2013.01)

(58) Field of Classification Search
CPC .......... B60B 23/06; B60B 23/08; B60B 23/10
See application file for complete search history.

(56) References Cited

U.S. PATENT DOCUMENTS

| 1,173,243 A | 2/1916 | Baker |
| 1,938,862 A * | 12/1933 | Roe ........................... B60B 5/02 |
| | | 301/95.102 |

(Continued)

FOREIGN PATENT DOCUMENTS

| AU | 661032 B2 * | 7/1995 | .............. F16K 1/34 |
| CH | 01669/14 | 10/2014 | |

(Continued)

*Primary Examiner* — Kip T Kotter
(74) *Attorney, Agent, or Firm* — thyssenkrupp North America, Inc.

(57) ABSTRACT

The invention relates to a vehicle wheel comprising a wheel rim, a wheel disc and at least one connecting element that connects the wheel disc and the wheel rim, wherein the connecting element is guided through a through-hole of the wheel rim and is joined in a joining channel of the wheel disc. According to the invention, an elongated sleeve (4, 4.1, 4.2, 4.3) is provided that surrounds the connecting element (3, 3.1, 3.2) coaxially, which sleeve is designed and arranged in such a way that at least part of said sleeve interlockingly extends into a corresponding recess (7) of the wheel rim (1.1, 1.2) and into a corresponding recess (8) of the wheel disc (2.1).

20 Claims, 5 Drawing Sheets

(56) References Cited

U.S. PATENT DOCUMENTS

| | | | | |
|---|---|---|---|---|
| 2,805,894 A * | 9/1957 | Gilbert | ............... | B60B 3/042 |
| | | | | 152/21 |
| 2,874,749 A * | 2/1959 | Brink | ............... | B60C 29/02 |
| | | | | 152/427 |
| 4,518,204 A * | 5/1985 | Takada | ............... | B60B 23/00 |
| | | | | 29/894.342 |
| 4,679,860 A * | 7/1987 | Koishi | ............... | B60B 23/10 |
| | | | | 301/11.3 |
| 6,312,058 B1 | 11/2001 | Lupyrypa | | |
| 2004/0021365 A1 | 2/2004 | Georgeff | | |
| 2008/0143171 A1 | 9/2008 | Wilson | | |
| 2013/0234497 A1 * | 9/2013 | Franklin | ............... | B60B 7/01 |
| | | | | 301/37.24 |
| 2016/0318335 A1 | 11/2016 | Werner et al. | | |
| 2016/0325582 A1 | 11/2016 | Werner et al. | | |
| 2017/0235077 A1 | 9/2017 | Werner et al. | | |

FOREIGN PATENT DOCUMENTS

| | | | | |
|---|---|---|---|---|
| CN | 1223204 A | 7/1999 | | |
| DE | 280481 C | 8/1913 | | |
| DE | 7200847 U | 5/1972 | | |
| DE | 3243473 A1 * | 5/1984 | ............ | B60B 23/06 |
| DE | 10105113 A1 | 2/2002 | | |
| EP | 1 174 285 B | 1/2002 | | |
| EP | 1858715 B1 | 11/2009 | | |
| EP | 3191313 B1 | 5/2018 | | |
| FR | 436626 A | 4/1912 | | |
| FR | 1114895 A | 4/1956 | | |
| FR | 2379389 A | 9/1978 | | |
| FR | 2471291 A | 6/1981 | | |
| GB | 173257 A | 12/1921 | | |
| GB | 767953 A * | 2/1957 | ............ | B60B 23/08 |
| JP | S59124702 U | 8/1984 | | |
| JP | 59195402 A * | 11/1984 | ............ | B60B 5/02 |
| JP | 60110503 A * | 6/1985 | ............ | B60B 1/06 |
| WO | 2006097856 A1 | 9/2006 | | |
| WO | WO-2010067383 A1 * | 6/2010 | ............ | B60B 3/005 |
| WO | 2015/090276 A | 6/2015 | | |
| WO | 2015090275 A1 | 6/2015 | | |
| WO | 2015106760 A1 | 7/2015 | | |
| WO | 2016/066769 A | 5/2016 | | |

* cited by examiner

VEHICLE WHEEL COMPRISING A WHEEL RIM AND A WHEEL DISC

BACKGROUND

Field

The present disclosure relates to a vehicle wheel with a wheel rim, a wheel disc and at least one connecting element connecting the wheel disc and the wheel rim, whereby the connecting element is guided through a clearance hole in the rim base of the wheel rim and joined in a joining channel of the wheel disc.

The vehicle wheel is used for all types of motorised vehicles, in particular for passenger cars and motorcycles.

The wheel disc may be designed as a wheel spider with spokes (spoke wheel) or as a largely closed-surface wheel disc.

For designs as a lightweight-construction vehicle wheel, wheel rims and/or wheel discs from light metal or fiber-reinforced plastic, for example, are used.

The connecting elements, multiple numbers of which are in most cases arranged around the circumference of the vehicle wheel, are each guided through one passage in the wheel rim and each joined in a force-fit manner to one of the joining channels arranged correspondingly across the circumference of the wheel disc.

The connecting elements may for example be designed as rivets or screws, whereby, in the example of a screw, the external thread of the screw shaft engages with an internal thread of the joining channel of the wheel disc.

Discussion of Background Information

A vehicle wheel of this type is known from printed document EP 1 858 715 B1. With this vehicle wheel, a star-shaped wheel disc (wheel spider) made from metal is joined to the wheel rim made from plastic by means of several connecting elements, which may be screws or rivets. The connecting element is, from the 'mouth' side of the wheel rim, in each case guided through one clearance hole in the rim base of the wheel rim and in each case screwed into or riveted to one joining channel of the spoke ends of the wheel spider. The wheel spider is supported, under the force-fit connection in the rim interior, against the rim base and thereby against the wheel rim. The forces arising on the wheel construction when the wheel is in operation are transferred from the wheel rim via the connecting element to the wheel spider.

The complex loads on the vehicle wheel present themselves as constantly varying operating loads which are dependent on the structural wheel load according to type of motor vehicle and payload, on the profile of the road surface, on vehicle handling through braking and accelerating, on temperature influences and on unusual effects such as potholes and driving over a curb.

For the purpose of transferring loads between wheel spider and wheel rim, the connection in accordance with the prior art uses force fit or frictional locking between the spoke ends and the wheel rim, whereby the necessary transfer of force is ensured by the preload applied to the connecting element, preferably screw element.

For the transfer of forces from the highly complex load, a huge preload force is required of the screw element, which in turn necessitates a considerably large cross section of the screw element and a correspondingly large contact surface of the wheel disc on the rim bed for the surface pressure so as to achieve a sufficiently high degree of force fit or frictional locking. Here, a rim base made from plastic in particular is subject to considerable vibratory-rubbing wear. The material-intensive design of the connection in the case of the vehicle wheel in accordance with printed document EP 1 858 715 B1 illustrates the high load requirements.

In the event of the force fit breaking down in the case of a possible overload (misuse load or as a result of creep of the material on the friction surfaces), the connecting element is subjected in a shearing manner to a high, dynamic transverse force.

In addition, particularly where there are eccentric loads at the connecting point, for example from a special spoke geometry, there is the danger of the connecting point separating, which likewise leads to the connecting element being placed under stress in a shearing manner.

Above all threaded connecting elements, like the screw element customarily used, carry a high risk of breakage when under stress in a shearing manner owing to the notch effect of their threads. In this respect, a sudden and unpredicted state of failure can occur at the connecting point, relevant to safety, between wheel disc and wheel rim.

SUMMARY

The problem underlying the present disclosure is therefore on the one hand to improve the reliability and durability of the connection between wheel disc and wheel rim and on the other, in light of the lightweight construction requirements placed on a lightweight construction vehicle wheel, minimize the mass requirement and the necessary installation space of the connection.

To solve the problem, in accordance with the present disclosure an elongated sleeve coaxially surrounding the connecting element is provided which is designed and arranged in such a way that it extends at least partially into, in each case, one corresponding recess of the wheel rim and the wheel disc in a form-fit manner.

The connection between wheel rim and wheel disc is effected in an interaction of the connecting element with the elongated sleeve. The connecting element is guided through, in each case, one clearance hole and joined in a firmly bonded and/or force-fit manner in the wheel disc, whilst in a coaxial arrangement to the longitudinal axis of the connecting element, an elongated sleeve is integrated at least in a form-fit manner into—in each case—one recess of the wheel rim and the wheel disc that corresponds to the shape of the elongated sleeve.

The connecting element which may preferably be a screw element, a threaded bolt or a press-in pin, brings about a preload force in an axial direction in particular in such a manner that a head section of the connecting element contacts with a rim outer side of the wheel rim, the shaft of the connecting element is guided loosely, i.e. at a distance from its inner lateral surface, through the clearance hole and one shaft end of the connecting element is inserted firmly into the joining channel of the wheel disc or spoke ends of the wheel spider provided for this purpose. The joining of the connecting element may for example occur by means of screwing in or pressing in, and/or by means of gluing.

The elongated sleeve, which may have a hollow cylindrical shape or shape with a different kind of hollow profile, secures the connection in particular through form fit with the corresponding recess of the wheel rim and the wheel disc in a direction orientated at right angles to the longitudinal axis of the connecting element.

With this design of the connection arrangement according to the present disclosure, efficient differentiation of force transfer via the connection occurs by the connecting element selectively undertaking the transfer of the longitudinal or tensile forces in an axial direction and the elongated sleeve coaxially surrounding it absorbing the transverse forces and bending moments in a radial direction.

The present disclosure assumes here that the highly complex loads on the wheel construction are composed to different and changing proportions of longitudinal forces ($F_A$) and transverse forces ($F_Q$) and also bending moments ($M_B$), which are transferred from the wheel disc via the individual connecting elements onto the wheel rim (cf. connection in accordance with the prior art according to FIG. 1).

The present disclosure also assumes that, in the case of a connection in accordance with the prior art, a considerable degree of preload force of the connecting element, dependent on the maximum transverse force arising, the manner of attachment and the friction value of the material pairing of the components involved in the connection (of the wheel rim, wheel disc), must be provided to transfer the combined longitudinal and transverse forces and to secure the screw connection. In addition to the longitudinal forces arising in the screw axis, the frictional locking between the wheel rim and the wheel disc needed for the transfer of the transverse forces arising must be achieved by means of a correspondingly high preload force of the connecting element.

Tests as part of the radial fatigue test using the example of a sports car have revealed that with a conventional screw connection between a lightweight metal wheel spider attached in the transition zone to the well of the rim base of the wheel rim, the forces at right angles to the screw axis are approximately 5 times as high as the longitudinal forces arising in the screw axis.

Using the material pairing of aluminium for the lightweight metal wheel spider and plastic for the rim base with a coefficient of friction of $\mu_T=0.3$, there also results a factor of approximately 17 for the necessary preload force of the screw element, which must be applied opposite a simple clamping force to transfer the pure longitudinal force arising.

The factor of the necessary preload force increases due to the dynamic proportion of the forces resulting from the vehicle wheel turning in a cyclical manner.

In addition, a further increase in the preload force factor should be taken into consideration in the event that an eccentrically acting axial force is present, as for example in the case of altered spoke geometry.

In the process, the level of the preload force must be selected with such a safety reserve that the additional occurrence of bending moments at the connecting point as a result of an eccentric load or misuse overload is compensated for, in order to avoid a separation of the connecting point and thereby directly shearing stress on the connecting element.

The design requirements in relation to a delicate lightweight construction vehicle wheel are an obstacle to the requirements for a high preload force of the connecting element to secure the connection between the wheel rim and the wheel disc.

Firstly, the high preload force needed requires above all the use of connecting elements with a large effective cross section and/or a large effective length, which cannot be introduced into delicate spokes with a small spoke cross section.

Secondly, it can be assumed that the high preload force brings about a correspondingly high surface pressure between the contact surfaces of the components involved (rim inner side of the wheel rim, spoke ends of the wheel disc) and does not permit a further reduction of the cross sections of the adjacent spoke ends of the wheel disc, since a further increase in surface pressure associated with this can lead to an excessive compressive load and hence to damage to the wheel rim and/or the wheel disc.

Through the separation of functions—according to the present disclosure—in the connection arrangement, in which the connecting element essentially only absorbs the longitudinal forces and the elongated sleeve absorbs the acting transverse forces and bending moments, the connecting element, in particular a screw element sensitive to shearing, is considerably relieved of the large transverse forces that arise.

In bringing about this separation of functions, the transverse forces are no longer transferred via a high degree of frictional locking between the wheel rim and the wheel disc but rather primarily through the form fit between the elongated sleeve and the wheel rim and the wheel disc, so that the connecting element essentially only has to transfer the remaining, essentially lesser longitudinal forces and hence the necessary preload force of the connecting element can be significantly reduced. Here the small degree of frictional locking remaining is no longer a decisive factor for the required load transfer.

This makes it possible firstly to reduce the cross section and/or the joining length of the connecting element and secondly reduces the surface pressure between the rim inner side of the wheel rim and spoke ends of the wheel disc, so that ultimately a slim design of the connecting point with smaller cross section surfaces of the adjacent spoke ends is possible and the connection is less susceptible to damage thanks to the smaller compression load on the material of the wheel rim and/or on the material of the wheel disc.

The possibility of using smaller-sized connecting elements and connecting points reduces the installation space required by the connection and thereby also generates a saving on weight and costs.

Despite minimization of the installation space of the connection, a greater security of the connection between the wheel rim and the wheel disc is ensured. In addition, in the event of an overload if excessive longitudinal force arises in the direction of the axis of the connecting element, removing the remaining frictional locking, thanks to the connection according to the present disclosure the risk of a sudden total failure of the connection is reduced, since the lack of frictional locking here is compensated for by what is primarily a form fit of the elongated sleeve with the wheel rim and the wheel disc and thereby no shear effect can arise on the connecting element.

The connection also becomes more secure thanks to the fact that a reduced-weight connecting element entails an increase in the effective length of elongation, and thereby reduces the undesired effect of the screw setting, which can lead to a decrease in the preload force.

When using, in particular, a screw element as a connecting element, on the one hand fewer supporting threads are needed owing to the minimised preload force, which leads to a reduction in the installation length required.

On the other hand the screw element can, owing to the minimised preload force, be designed with a slimmer cross section, whereby, with the screw-in depth remaining the same, the number of screwed threads increases, which in turn improves the self-retention of the connection and hence the security thereof.

The screw element can, owing to the reduced preload force which it has to provide, depending on the usage requirements be designed shorter and/or with a slimmer cross section, whereby, assisted by the elongated sleeve, a secure connection is always ensured.

With one advantageous embodiment, the corresponding recess of the wheel rim is designed at least partially as a radial extension of the clearance hole.

To put it another way, with this design the section of the elongated sleeve that extends in the wheel rim at least partially surrounds the clearance hole of the wheel rim in a radial extension. In this section of the elongated sleeve, the shaft of the connecting element is guided directly, but with clearance, through the hollow cross section of the elongated sleeve.

By means of this design, firstly the installation space necessary for the connection can be minimised further. The elongated sleeve is arranged in the immediate vicinity of the connecting element without the elongated sleeve and the connecting element mutually influencing each other in their intended, differing effect.

Secondly, this design is easier to manufacture since the recess for the arrangement of the elongated sleeve can be constructed as a simple milled-out portion of the clearance hole present in the wheel rim.

Not least, the section of the elongated sleeve that extends in the wheel rim offers, in the manner of a lining of the clearance hole, mechanical protection of the material of the wheel rim in the area of the clearance hole.

With a further advantageous embodiment, the corresponding recess of the wheel disc is partially designed as a radial extension of the joining channel.

With this design, the section of the elongated sleeve that extends in the wheel disc lines a part of the joining channel in a radial extension. In this section of the elongated sleeve, the connecting element is guided directly, but with clearance, through the hollow cross section of the elongated sleeve. A shaft end of the connecting element that protrudes beyond this section of the elongated sleeve engages in the remaining joining channel in the previously described manner with the wheel disc or the spoke ends of the wheel spider.

Preferably the elongated sleeve has an annular cylindrical design—in the shape of a hollow cylinder. In this cross-sectional design of the elongated sleeve, the arising transverse forces can be compensated for particularly evenly.

In addition, the corresponding recesses required for receiving the hollow cylindrical elongated sleeve in the wheel rim and the wheel disc can be manufactured with a simpler tool.

Preferably it is provided that the section that extends in the wheel rim and/or the section of the elongated sleeve that extends in the wheel disc has a material bond and/or is bonded in a force-fit manner with the wheel rim or the wheel disc.

By this means, the direct transfer of the transverse forces via the elongated sleeve can be significantly improved and thereby the security of the connection increased further.

In the practical execution, the section of the elongated sleeve that extends in the wheel rim can be screwed and/or glued and/or inserted by means of an interference fit into the associated recess.

Likewise, the section of the elongated sleeve that extends in the wheel disc can be screwed and/or glued and/or inserted by means of an interference fit into the associated recess.

The connection techniques can be provided independently of one another for the section that extends in the wheel rim and the section of the elongated sleeve extending in the wheel disc.

In particular, as a result of this, the assembly processes for assembly of the vehicle wheel can also be designed more flexibly.

Not least the additional connection techniques enable positional securing and/or fixing of the elongated sleeve during the wheel assembly.

In a preferred development of the present disclosure, the elongated sleeve has, on an end facing the rim outer side, a preferably tapered, widened peripheral area with a seat surface for the seat of a head section, preferably tapered in design, of the connecting element.

The widened edge of the elongated sleeve provides, on the one hand, an additional surface for the attachment of the head section of the connecting element to the elongated sleeve and on the other hand an additional surface of the elongated sleeve for the attachment on the wheel rim and thereby improves the distribution of the surface pressure acting on the wheel rim.

The distribution of the surface pressure is improved further by the tapered design of the peripheral area and of the seat surface of the head section of the connecting element.

The surface pressure is also favourably influenced by the elongated sleeve having a widened peripheral area in the form of a support flange for positioning on the rim outer side of the wheel rim, which provides an additional surface of the elongated sleeve for the attachment on the wheel rim.

Preferably it is provided that the seat surface of the elongated sleeve has a rough surface structure, preferably a corrugated or serrated surface structure.

By this means, with the help of the elongated sleeve, the self-retention against the loosening of the connecting element can be strengthened and thereby the security of the connection be further increased.

The security of the connection can also be increased by the contact surface of the head section that corresponds to the seat surface having a rough surface structure, preferably a corrugated or serrated surface structure.

In one advantageous embodiment at least one perforated disc is provided which is arranged between the rim inner side of the wheel rim and the wheel attachment side of the wheel disc.

The perforated disc is in particular designed in such a way that it, in the assembled state, where the perforated disc is arranged between the rim inner side of the wheel rim and the wheel attachment side of the wheel disc, surrounds the elongated sleeve or is enclosed by the latter.

By this means, using a corresponding material pairing, the friction conditions between the contact surfaces of the perforated disc, the wheel rim and the wheel disc can be set in such a way that the requisite preload force of the connecting element and consequently the surface pressure in the connection can be reduced further.

In particular, in an interaction of the perforated disc with the elongated sleeve, the vibratory-rubbing wear between the elongated sleeve and the wheel rim and also between the wheel rim and the wheel disc can be lessened, which further improves the durability and reliability of the connection.

In addition, by this means the wheel disc can be attached, contactless, to the wheel rim, so that the risk of contact corrosion between the wheel rim and wheel disc can be minimised and better compatibility of the thermal expansion can be achieved.

Alternatively, and with the same advantages, the elongated sleeve has a flange ring which is arranged between the rim inner side of the wheel rim and the wheel attachment side of the wheel disc.

In addition, this embodiment is particularly easy to assemble.

The set problem is solved, in accordance with the present disclosure, also by a vehicle wheel in which the connecting element has a piston-like shaft section, which has a cross section that is radially extended compared with the cross section of a shaft section at the end and is designed and arranged so as to at least partially extend into, in each case, one corresponding recess of the clearance hole of the wheel rim and the joining channel of the wheel disc in a form-fit manner.

To execute the connection between the wheel rim and the wheel disc, the combined connecting element, which may be designed similar to a screw or a rivet, uses two shaft sections, whereby the shaft section at the end is firmly bonded and/or joined in a force-fit manner in the joining channel of the wheel disc and the piston-like shaft section sits at least in a form-fit manner in—in each case—one recess of the clearance hole and the joining channel which corresponds to the shape of the piston-like shaft section.

The piston-like shaft section forming a form fit can be arranged directly adjacent to the shaft section at the end, which acts in a force-fit manner in the joining channel.

The joining of the shaft section at the end in the joining channel of the wheel disc may for example occur by means of screwing in, pressing in and/or gluing in.

The combined connecting element brings about, by means of a head section that contacts with the rim outer side of the wheel rim or the recess of the clearance hole and the shaft section at the end that engages with the wheel disc, the necessary preload force of the connection in the direction of the longitudinal axis of the connecting element, whilst the piston-like shaft section in a form fit with the recess of the clearance hole and the joining channel performs the role of securing the connection in a transverse direction relative to the longitudinal axis of the connecting element.

With this alternative design, according to the present disclosure, of the connection there likewise occurs efficient differentiation of the force transfer by the connecting element, during operation, carrying out the transfer of longitudinal forces in an axial direction overall, but the absorption of transverse forces and bending moments essentially only being performed by the radially extended shaft section, which thereby experiences a combined load of longitudinal and transverse forces.

The transverse forces are, in the same manner as the design of the elongated sleeve, not transferred via the frictional locking between the wheel rim and the wheel disc but primarily through the form fit of the piston-like shaft section with the recess of the clearance hole of the wheel rim and the joining channel of the wheel disc, so that the remaining connecting element, in particular the shaft section, at the end, of the connecting element essentially only has to transfer the longitudinal forces and therefore the requisite preload force of the connecting element can be significantly reduced. Here, too, the small degree of frictional locking remaining is no longer a definitive factor for the necessary load transfer.

The shaft section transferring shear force and extended in the manner of a piston largely prevents, as a result of its larger cross section with a preferably notch-free, smooth surface, shear effects as may arise on a customary, threaded, shaft section that absorbs tensile force. By contrast, the shaft section at the end which may be threaded is not exposed to any shearing load thanks to its position, in accordance with the present disclosure, solely in the joining channel of the wheel disc.

This makes it possible to reduce the cross section and/or the joining length of the shaft section, at the end, of the connecting element, so that ultimately a slim design of the connecting point to the wheel disc with smaller cross section surfaces of the adjacent wheel disc or spoke ends of the wheel disc likewise becomes possible and the connection is less susceptible to damage owing to the lower compressive load on the material of the wheel rim and/or the wheel disc.

Compared with the design of a connection arrangement with a connecting element in combination with an elongated sleeve, the alternative design described above of the combined connecting element with two shaft sections has particular advantages in respect of the work and costs involved in the manufacture of the connecting parts and the components to be connected, and in the assembly of the vehicle wheel.

In accordance with an advantageous embodiment, at least one perforated disc is provided which, surrounding the piston-like shaft section, is arranged between the rim inner side of the wheel rim and the wheel attachment side of the wheel disc.

By this means, with a suitable choice of material, the friction conditions between the contact surfaces of the perforated disc, the wheel rim and wheel disc can be set in such a way that the requisite preload force of the combined connecting element and consequently the surface pressure in the connection can be reduced further.

In particular, it is possible in an interaction of the perforated disc with the combined connecting element for the vibratory-rubbing wear between the connecting element and the wheel rim and between the wheel rim and the wheel disc to be lessened, which improves the durability and reliability of the connection.

Through the contactless attachment of the wheel disc to the wheel rim, the risk of contact corrosion between the components is minimized and better compatibility of the thermal expansion is achieved.

BRIEF DESCRIPTION OF THE DRAWINGS

The example vehicle wheels in accordance with the present disclosure are explained in more detail below using various embodiments.

DETAILED DESCRIPTION

Figure 1:
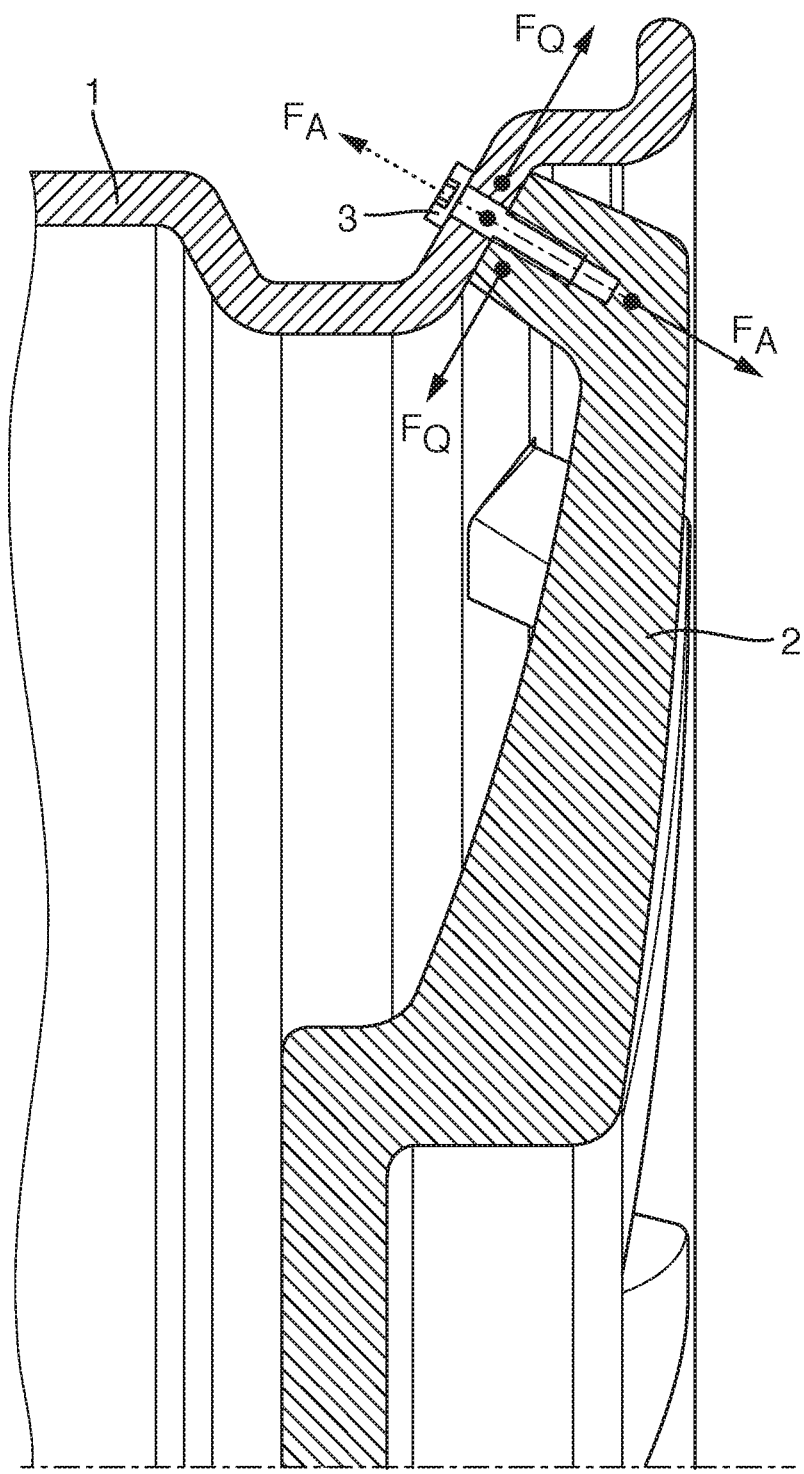
FIG. 1 is an extract of a cross-sectional view of a vehicle wheel with a wheel rim and wheel spider in accordance with the prior art.

FIG. 1 shows a section of a vehicle wheel in accordance with the prior art with a wheel rim 1 and a wheel spider 2, which are connected by means of a connecting element (flat-head screw) 3 in the area of the rim base in the transition zone to the well of the wheel rim 1. The loads arising on the wheel construction are composed, to different and changing proportions, of longitudinal forces ($F_A$), transverse forces ($F_Q$) and bending moments ($M_B$), which are transferred from the wheel disc or from the wheel spider 2 via the individual connecting elements 3 to the rim base of the wheel rim 1. From the connecting element 3, on the one hand the longitudinal and/or tensile forces ($F_A$) acting in the longitudinal axis, and on the other hand the transverse forces ($F_Q$) acting at right angles to the longitudinal axis, must be transferred through the provision of corresponding frictional locking at the contact surfaces between the rim base and the wheel disc or the wheel spider 2, which requires a very great preload force of the connecting element.

Figure 2A:
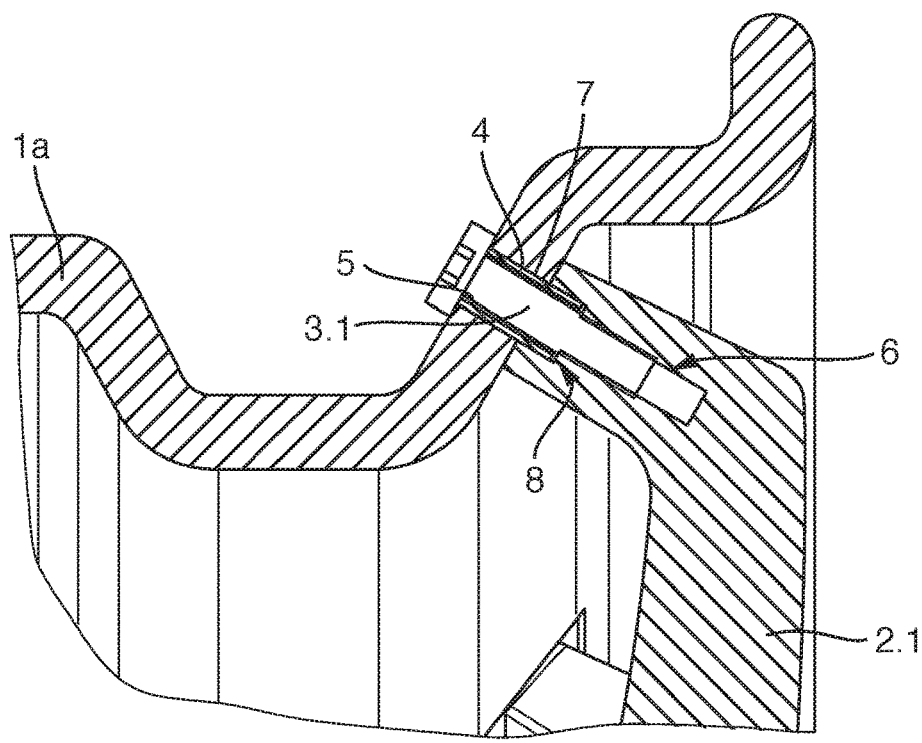
FIG. 2a is an extract of a cross-sectional view of a vehicle wheel in accordance with the present disclosure with a wheel rim and wheel spider, connected by means of a connection arrangement according to a first design variant with a flat-head bolt and an annular cylindrical elongated sleeve.

The first embodiment of the present disclosure shows, in FIG. 2a, a section of a vehicle wheel in accordance with the present disclosure consisting of a wheel rim 1a with a rim base made from fiber composite material and a wheel spider 2.1 made from aluminum.

In order to attach the wheel spider 2.1 to the wheel rim 1a, several connection arrangements in accordance with the present disclosure, arranged distributed around the circumference of the wheel rim 1a or the wheel spider 2.1 and corresponding to the number of spokes, are provided in the area of the rim base in the transition zone to the well; these each comprise a flat-head bolt 3.1 as a connecting element and an elongated sleeve 4 with an annular cylindrical shape, each of which occupy a clearance hole 5 of the rim base and an assigned joining channel 6 of the spoke end of the wheel spider 2.

The annular cylindrical elongated sleeve 4 extends with a first section across the entire cross section of the rim base and with a second section into the spoke end of the wheel spider 2.1. The first section of the elongated sleeve 4 completely occupies the clearance hole 5 of the rim base and is flush with the clearance hole 5 on the rim outer side; on the rim inner side the second section of the elongated sleeve projects beyond the clearance hole 5, so that the elongated sleeve 4, in the assembled state, occupies part of the joining channel 6 in the spoke end of the wheel spider 2.1.

In order to achieve the form fit of the elongated sleeve 4 according to FIG. 2a with the rim base and the wheel spider 2.1, the first section of the elongated sleeve 4 is embedded in a radial extension 7 of the clearance hole 5 designed with the same shape as its (the first section's) outer contour, whereby the second section of the elongated sleeve 4 that projects beyond the rim inner side of the rim base is inserted into a recess 8 of the joining channel 6 of the spoke end of the wheel spider 2.1 that corresponds and has the same shape as its (the second section's) outer contour. The detail view of FIG. 2c shows the radial extension 7 of the clearance hole 5 and the recess 8 of the joining channel 6 of FIG. 2a more clearly by omitting the connecting element 3 and the elongated sleeve 4 of FIG. 2a.

The recess 8 of the joining channel 6 is a partial radial extension 8 of the joining channel 6 and extends approximately across a third to a half of the total length of the joining channel. The end of the recess 8 forms an axial contact surface for the elongated sleeve 4 that is inserted.

The flat head of the flat-head bolt 3.1 contacts with the rim outer side of the rim base and with the elongated sleeve 4 that ends flush on the rim outer side. The shaft of the flat-head bolt 3.1 is guided loosely, i.e. at a distance from the inner lateral surface of the elongated sleeve 4, through the latter. A shaft end of the flat-head bolt 3.1 projects beyond the end of the elongated sleeve 4 mounted in the recess 6 is inserted, glued in, screwed in, or pressed into the joining channel 6 of the wheel spider 2.1. A shaft end of the flat-head bolt 3.1, which projects beyond the elongated sleeve 4 mounted in the recess 8, has a thread which engages with the joining channel 6 of the spoke end of the wheel spider 2.1 equipped with an internal thread.

Thereby on the one hand the elongated sleeve 4 is fixed in a form-fit manner and on the other hand the necessary preload of the flat-head bolt 3.1 for the creation of the effective connection between wheel rim 1a and wheel spider 2.1 is generated. This connection in accordance with the present disclosure thereby occurs with functional separation of force absorption.

The flat-head bolt 3.1, during operation of the vehicle wheel, essentially transfers only the longitudinal forces $F_A$ arising, whilst the elongated sleeve 4 mounted in a form-fit manner essentially absorbs the transverse forces $F_Q$ and bending moments $M_B$ arising.

The relieving of (the load on) the flat-head bolt 3.1 with the load distribution onto this connection arrangement enables, as outlined, a slim design of the flat-head bolt compared with a connection in accordance with the prior art according to FIG. 1 and a minimisation of the required friction surfaces between the rim base and the spoke ends of the wheel spider 2.1.

Through the lower compressive load on the rim base made from fiber composite material as a result of the reducible surface pressure, and through the avoidance of any shearing loads on the flat-head bolt 3.1 by means of the elongated sleeve 4 introduced in a form-fit manner into the wheel rim 1a and the wheel spider 2.1, the connection is extremely durable and reliable, which guarantees the security of the connection and thereby of the vehicle wheel to a high level.

In order to further improve the security of the connection, the section of the elongated sleeve 4 that extends in the rim base can be glued in the clearance hole 5 of the rim base or sit in the clearance hole 5 of the rim base by means of an interference fit.

Moreover, the section of the elongated sleeve 4 that extends into the wheel spider 2.1 can be glued into the recess 8 of the joining channel 6 of the wheel spider 2.1 or be inserted into the recess 8 by means of an interference fit.

Figure 2B:
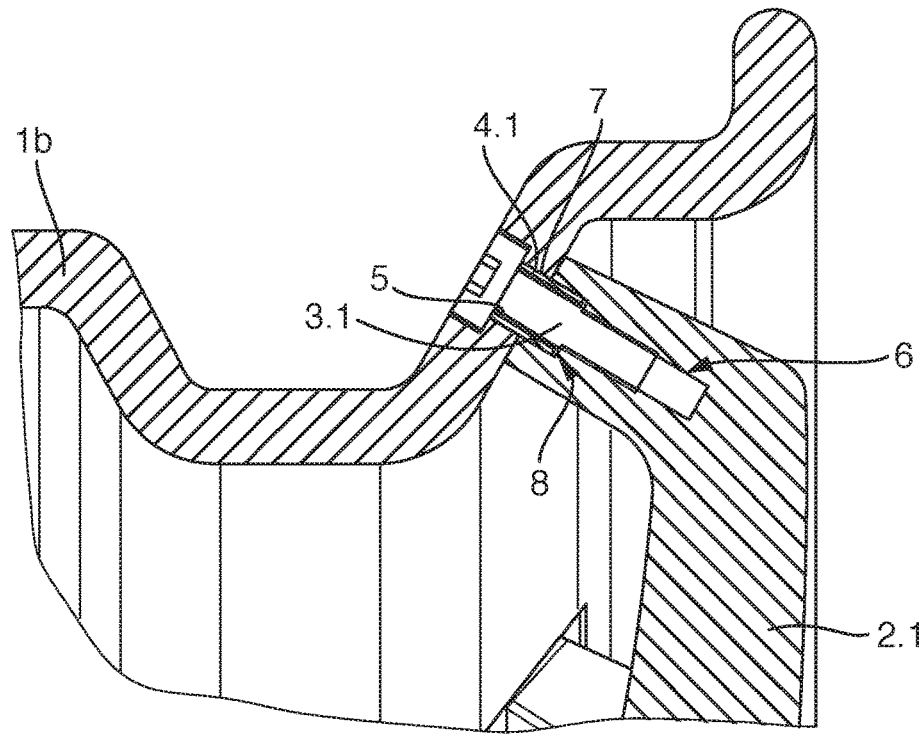
FIG. 2b is an extract of a cross-sectional view of the vehicle wheel in accordance with FIG. 2a, connected by means of a connection arrangement according to a second design variant with the flat-head bolt according to FIG. 2a and a annular cylindrical elongated sleeve in a recessed arrangement.
Figure 2C:
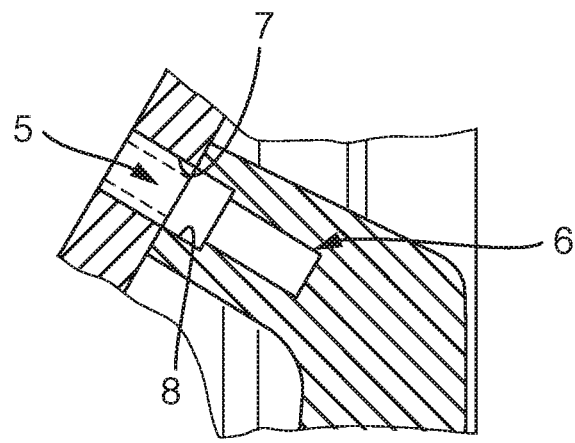
FIG. 2c is an extract of a detail view of the example clearance hole of the wheel rim and the example joining channel of the wheel spider of FIG. 2a, shown without the example connecting element and without the example elongated sleeve.

FIG. 2b shows, in a second embodiment, the vehicle wheel according to FIG. 2a with an alternative connection arrangement for attaching the wheel spider 2.1 to an example wheel rim 1b.

Below, only the differences vis-à-vis the preceding embodiment shall be discussed.

With this embodiment according to FIG. 2b, the connection arrangements in accordance with the present disclosure comprise, in each case, the flat-head bolt 3.1 according to FIG. 2a as a connecting element combined with an annular cylindrical elongated sleeve 4.1 in a shorter design.

With the shorter design of the annular cylindrical elongated sleeve 4.1, the first section of the elongated sleeve 4.1 arranged in the rim base extends, unlike the elongated sleeve 4 according to FIG. 2a, across only part of the rim base cross section, so that the end of the elongated sleeve 4.1 directed towards the rim outer side ends in the rim base. The clearance hole 5 of the rim base has a corresponding recess 7 that extends to an appropriately shorter extent for the first section.

With an adjacent recess of the rim base that corresponds to the flat head, the flat-head bolt 3.1 can be arranged countersunk in the rim base.

The length of the first section of the elongated sleeve 4.1 that extends in the rim base is of such dimensions here that the head section that contacts flush with the end of the recess of the rim base and contacts with the elongated sleeve 4.1 is flush with the rim outer side.

Thanks to this design it is possible, without restricting the separation of functions, in accordance with the present disclosure, of the force absorption by flat-head bolts 3.1 and elongated sleeve 4.1 and thereby without impairing the advantageous effect of the connection, to reduce the space and material requirement of the connection.

In addition, the recessed design of the flat-head bolt 3.1 facilitates the fitting of a tyre, not shown here, onto the rim base.

Figure 3:
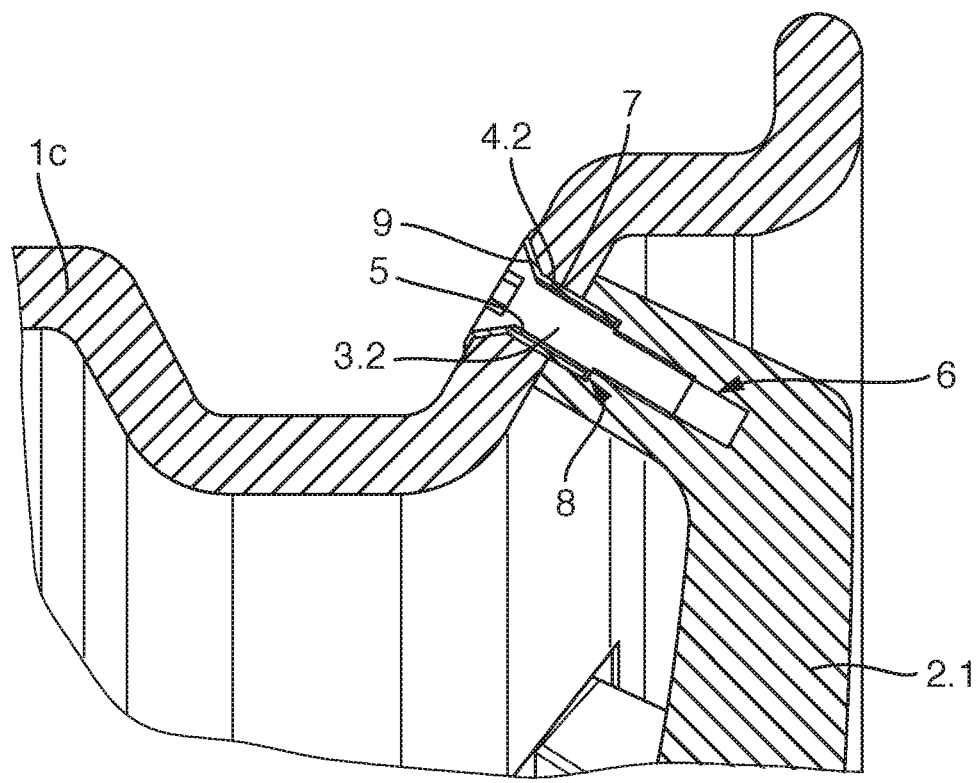
FIG. 3 is an extract of a cross-sectional view of a vehicle wheel, connected by means of a connection arrangement according to a third design variant with a countersunk bolt and an elongated sleeve with a peripheral area widened in a tapered manner and collar-shaped support flange.

FIG. 3 shows, in a third embodiment, the vehicle wheel according to FIG. 2a with a further alternative connection arrangement for attaching the wheel spider 2.1 to an example wheel rim 1c.

Below, only the differences vis-à-vis the embodiment according to FIG. 2a shall be discussed.

With this embodiment according to FIG. 3, the connection arrangements in accordance with the present disclosure comprise, in each case, a countersunk bolt 3.2 as a connecting element and an elongated sleeve 4.2.

The elongated sleeve 4.2 according to FIG. 3 has, unlike the annular cylindrical elongated sleeve 4 according to FIG. 2a, in addition to an annual cylindrical area directed towards the rim inner side, a peripheral area widened in a tapered manner directed towards the rim outer side, with a collar-shaped support flange.

The first section of the elongated sleeve 4.2 thus formed that extends across the entire cross section of the rim base is arranged in a radial extension 7 of the clearance hole 5 designed to correspond to the shape of its (the section's) outer contour, whereby the tapered peripheral area of the elongated sleeve 4.2 contacts with a chamfered contact face of the recess 7 of the clearance hole 5 and the support flange of the peripheral area of the elongated sleeve 4.2 extends across the surface of the rim outer side.

The countersunk bolt 3.2 is guided loosely through the elongated sleeve 4.2, whereby its countersunk head is received by the peripheral area, widened in a tapered manner, of the elongated sleeve 4.2 and contacts with a seat surface 9 that corresponds to the countersunk head.

Thereby the attachment surface of the elongated sleeve 4.2 to the rim base is increased, by which means the surface pressure between the elongated sleeve 4.2 and the rim base is reduced, which, particularly with the rim base made from fiber composite material, means considerable preservation of material.

In addition, by means of the elongated sleeve 4.2 the attachment area of the countersunk head of the countersunk bolt 3.2 to the rim base is increased and hence, with the same advantages, the surface pressure between the countersunk bolt 3.2 and the rim base is reduced.

Figure 4:
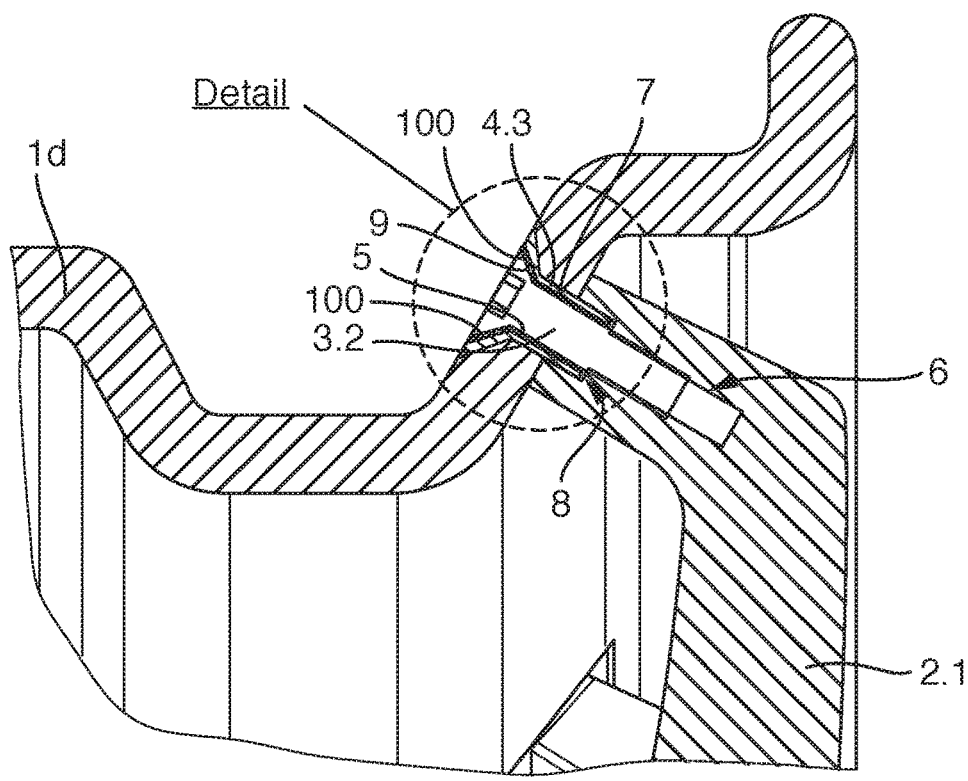
FIG. 4 is an extract of a cross-sectional view of a vehicle wheel, connected by means of connection arrangement according to a fourth design variant with the countersunk bolt according to FIG. 3 and an elongated sleeve with a peripheral area widened in a tapered manner in a recessed arrangement.

FIG. 4 shows a fourth embodiment of a vehicle wheel in a similar design to FIG. 3 with a further alternative connection arrangement for attaching the wheel spider 2.1 to an example wheel rim 1d.

Below, only the differences vis-à-vis the embodiment according to FIG. 3 shall be discussed.

With this embodiment according to FIG. 4, the connection arrangements in accordance with the present disclosure comprise, in each case, the countersunk bolt 3.2 according to FIG. 3 as a connecting element combined with an elongated sleeve 4.3.

The elongated sleeve 4.3 in accordance with FIG. 4 has, unlike the elongated sleeve 4.2 in accordance with FIG. 3, in addition to the annular cylindrical area directed towards the rim inner side, a peripheral area widened in a tapered manner and thickened and directed towards the rim outer side.

The first section of the elongated sleeve 4.3 that extends across the entire cross section of the rim base is arranged in a radial extension 7 of the clearance hole 5 designed so as to correspond to the shape of its (the section's) outer contour, whereby the tapered peripheral area of the elongated sleeve 4.2 contacts with a chamfered contact face of the recess 7 of the clearance hole 5.

The peripheral area, widened in a tapered manner and thickened, of the elongated sleeve 4.3 is flush with the rim outer side of the rim base.

The countersunk head of the countersunk bolt 3.2 is, in the peripheral area, widened in a tapered manner, of the elongated sleeve 4.3, placed so as to correspond to its seat surface 9, so that the entire connection arrangement is flush with the rim outer side.

Through this embodiment, too, the attachment surface of the elongated sleeve 4.3 to the rim base and the attachment surface of the countersunk head of the bolt 3.2 to the elongated sleeve 4.3 are increased and hence the surface pressure between the countersunk head of the countersunk bolt 3.2, the elongated sleeve 4.3 and the rim base of the wheel rim 1d is reduced.

In addition, the recessed design of countersunk bolt 3.2 and elongated sleeve 4.3 simplifies the fitting of the tyre, not shown here, onto the rim base.

Figure 4A:
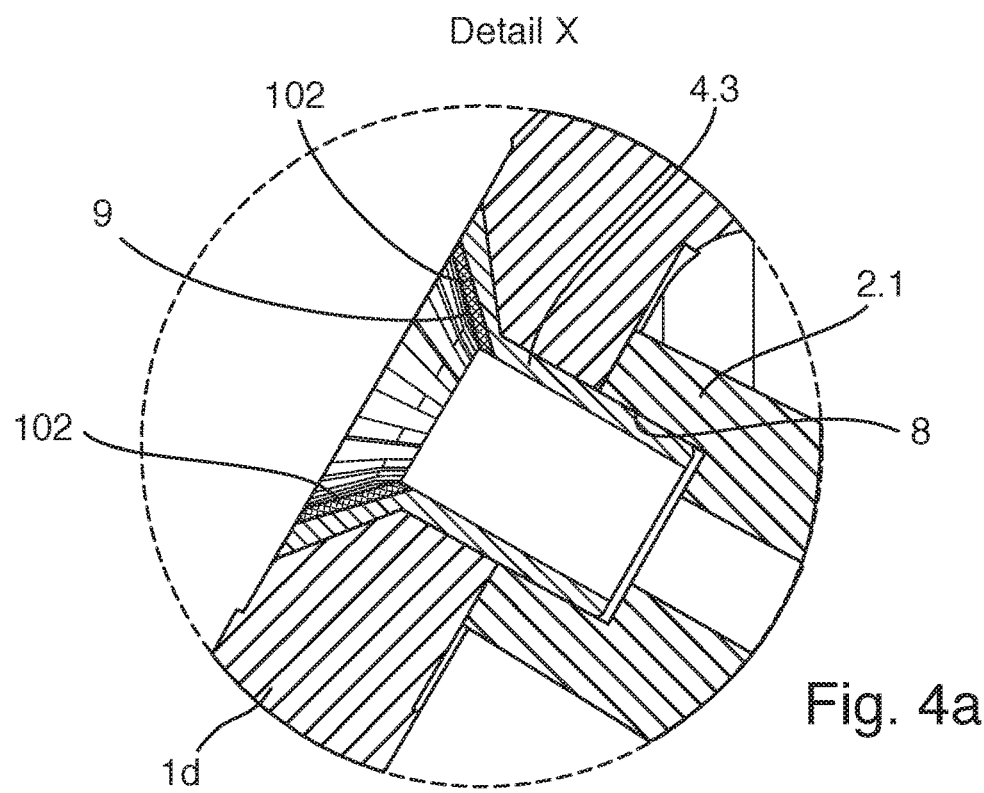
FIG. 4a is a detailed view X of the connecting point of the vehicle wheel according to FIG. 4 without the connection element.

The seat surface 9 of the peripheral area, widened in a tapered manner, of the elongated sleeve 4.3—like of the elongated sleeve 4.2 too—can additionally be designed to have a roughened or corrugated feature 102, as shown in FIG. 4a in an enlarged detailed view X of the elongated sleeve 4.3 according to FIG. 4. In this detailed view, the countersunk bolt 3.2 is not shown so as to make things easier to see.

Preferably, a contact surface of the countersunk head of the countersunk bolt 3.2 facing the seat surface 9 is also designed to have a roughened or corrugated feature 100.

As a result the self-retention of the bolt 3.2 against becoming loose is increased, which further increases the security of the connection.

Figure 5:
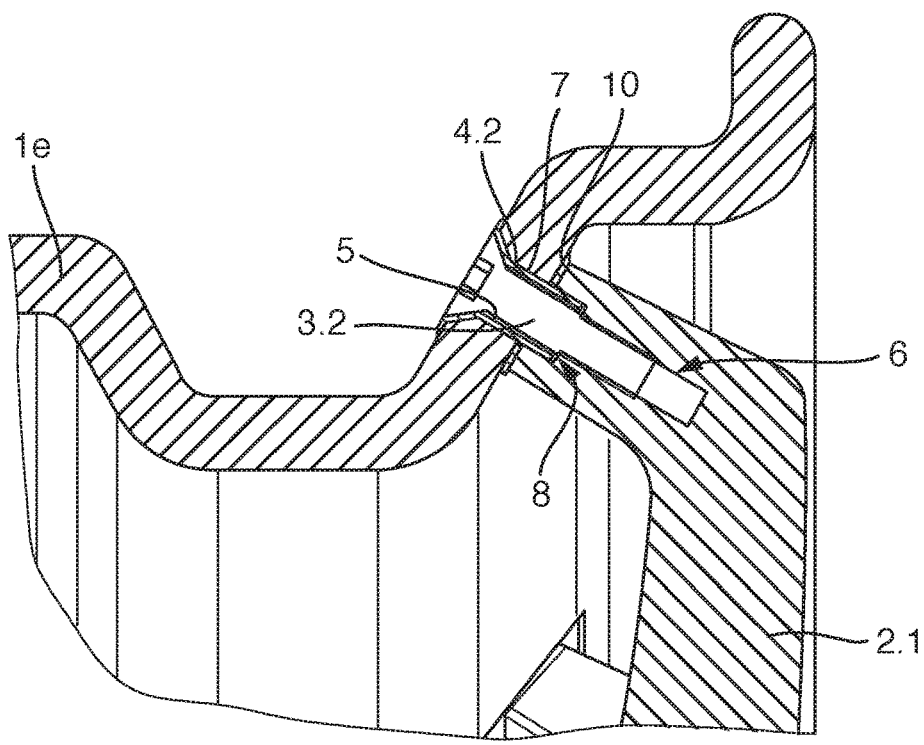
FIG. 5 is an extract of a cross-sectional view of an example vehicle wheel, connected by means of a connection arrangement according to a fifth design variant with the countersunk bolt and the elongated sleeve according to FIG. 3 and a perforated disc.

FIG. 5 shows, in a fifth embodiment, a vehicle wheel in a similar design to that according to FIG. 3 with a further alternative connection arrangement for attaching the wheel spider 2.1 to an example wheel rim 1e.

With this embodiment according to FIG. 5, the connection arrangements in accordance with the present disclosure comprise, in each case, a countersunk bolt 3.2 and an elongated sleeve 4.2 as per the design according to the embodiment in FIG. 3.

Unlike the embodiment according to FIG. 3, the connection arrangement additionally has a perforated disc 10 which surrounds the second section of the elongated sleeve 4.2 that protrudes beyond the clearance hole 5 on the rim inner side.

Preferably, in a pre-assembly stage the perforated disc 10 is, on the rim inner side of the rim base—in each case surrounding a clearance hole 5—connected to the wheel rim 1e or, on the attachment side of the spoke ends—in each case surrounding a joining channel 6—connected to the wheel spider 2.1.

The perforated disc 10 is, in the final assembly stage of the vehicle wheel, arranged between the contact surfaces of the rim inner side of the rim base and the attachment side of the spoke end of the wheel spider 2.1. It can, through a suitable choice of material and suitable design, be used to change and set the friction conditions between the contact surfaces, in order to further reduce the required preload force of the countersunk bolt 3.2.

In addition, by this means the vibratory-rubbing wear arising between the rim base and the wheel spider 2.1 and if applicable also between the elongated sleeve 4.2 and the rim base can be reduced further, which has a particularly favourable impact in the case of the rim base made from fiber composite material and further improves the durability and reliability of the connection.

In addition, in an interaction between the elongated sleeve 4.2 and the perforated disc 10 the wheel spider 2.1 can be attached, contactless, to the rim base, so that the risk of contact corrosion between the materials of the wheel rim 2.1 and the wheel spider 2.1 can be minimised and better compatibility of the thermal expansion can be achieved.

Figure 6:
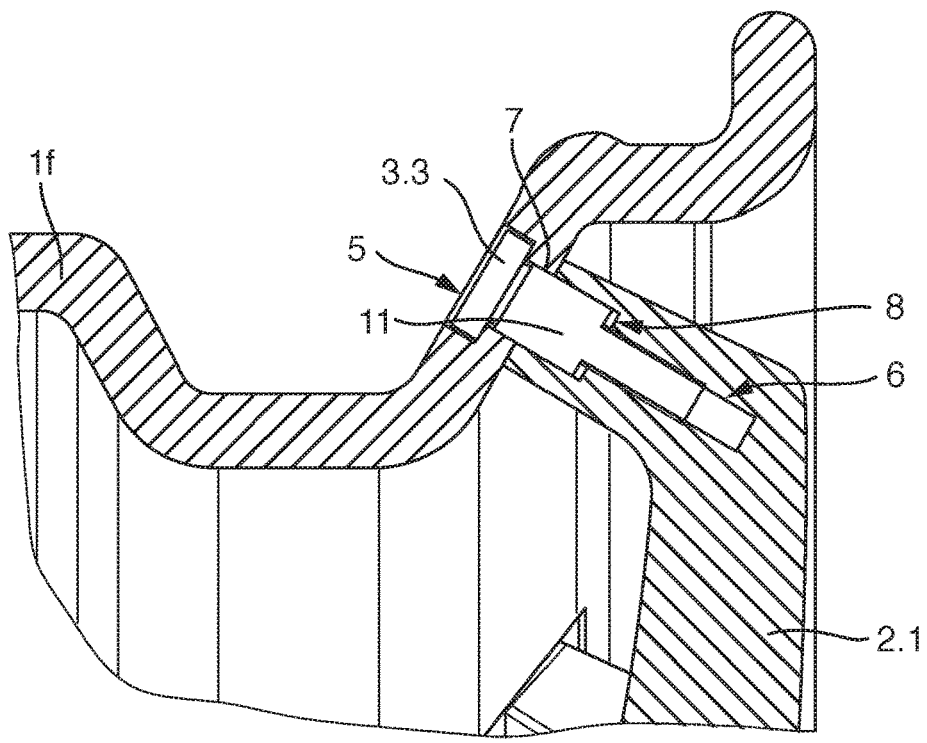
FIG. 6 is an extract of a cross-sectional view of an example vehicle wheel, connected by means of a flat-head bolt with a piston-like shaft section.

FIG. 6 depicts a section of a vehicle wheel in accordance with the present disclosure, consisting of an example wheel rim if made from aluminum and a wheel spider 2.1 made from aluminum.

To attach the wheel spider 2.1 to the wheel rim 1f, several flat-head bolts 3.3, arranged distributed around the circumference of the wheel rim if or the wheel spider 2.1 and corresponding to the number of spokes, are provided in the area of the rim base in the transition zone to the well as connecting elements which in each case occupy a clearance hole 5 of the rim base and an allocated joining channel 6 of the spoke end of the wheel spider 2.1.

The flat-head bolt 3.3 has a piston-like shaft section 11 with a smooth surface which directly attaches to the shaft end at the end, which is equipped with a thread for joining in the wheel spider 2.1. The piston-like shaft section 11 has, compared with the cross section of the shaft section at the end, a radially widened cross section and extends, in the assembled state, with a first section partially in the rim base and with a second section into the spoke end of the wheel spider 2.1.

The first section of the piston-like shaft section 11 occupies the clearance hole 5 of the rim base only partially, so that the clearance hole 5 of the rim base has a correspondingly partially constructed radial extension 7 for the first section. Attached to this is a recess for the flat head of the flat-head bolt 3.3.

The flat-head bolt 3.3 is, in the screwed-in state, flush with the rim outer side of the rim base, whereby the flat head is received by the recess envisaged for this and a bottom surface of the recess serves as a seat surface for the flat head.

The shaft section at the end of the flat-head bolt 3.3 brings about, by means of its external thread which engages with the internal thread of the joining channel 6 of the wheel spider 2.1, a force-fit screw connection.

In order to achieve the additional form fit between wheel rim 1f, wheel spider 2.1, and piston-like shaft section 11, in the screwed-in state of the flat-head bolt 3.3 the first section of the piston-like shaft section 11 sits in a radial extension 7 of the clearance hole 5 that corresponds in shape to its (the section's) outer contour and the second section sits in a recess 8 of the joining channel 6 of the spoke end of the wheel spider 2 that corresponds in shape to its (the section's) outer contour. The recess 8 of the joining channel 6 is a partial radial extension 8 of the joining channel 6.

The first section of the piston-like shaft section 11 extends, in the screwed-in state of the flat-head bolt 3.3, approximately across half of the total length of the clearance hole 5 whilst the second section extends approximately across a quarter to a third of the total length of the joining channel 6.

As a result of this, on the one hand the piston-like shaft section 11 is fixed in a form-fit manner and on the other hand the necessary preload of the flat-head bolt 3.3 for creating the effective connection between wheel rim if and wheel spider 2.1 is generated.

The transverse forces $F_Q$ are, during operation of the vehicle wheel, not transferred via frictional locking between the contact surfaces of the rim base and the wheel spider 2 but primarily through the form-fit connection between the piston-like shaft section 11 and the extension 7 of the clearance hole 5 or the recess 8 of the joining channel 6.

As a result of this, less preload force of the flat-head bolt 3.3 is required to achieve a secure connection, which is why the thread cross section of the shaft section at the end—as apparent in FIG. 6—can be significantly smaller than the cross section of the piston-like shaft section 11.

The connecting point is thereby, compared with a connection in accordance with the prior art according to FIG. 1, designed slimmer and at the same time has smaller contact surfaces of the rim inner side of the wheel rim if and the spoke ends of the wheel spider 2.1 that contact with the rim inner side.

Owing to the lower compressive load on the rim base and the spoke ends of the wheel spider 2.1 made from aluminum, this connection is also less susceptible to damage and reliable in the long term, which guarantees the security of the connection to a high level.

The invention claimed is:

1. A vehicle wheel comprising:
   a wheel rim;
   a wheel disc;
   a connecting element that connects the wheel disc and the wheel rim, the connecting element extending through a clearance hole of the wheel rim and into a joining channel of the wheel disc, wherein the connecting element engages directly with the wheel disc in the joining channel; and an elongated sleeve that surrounds the connecting element coaxially, the elongated sleeve extending at least partially into a recess of the wheel rim and a recess of the wheel disc in a form-fit manner.

2. The vehicle wheel of claim 1, wherein the recess of the wheel rim is at least partially a radial extension of the clearance hole.

3. The vehicle wheel of claim 2, wherein the recess of the wheel disc is partially a radial extension of the joining channel.

4. The vehicle wheel of claim 2, wherein the elongated sleeve comprises, on an end facing a rim outer side, a widened peripheral area with a seat surface for a seat of a head section of the connecting element.

5. The vehicle wheel of claim 4, wherein the widened peripheral area is tapered and the head section is of tapered design.

6. The vehicle wheel of claim 4, wherein the seat surface has a rough surface structure.

7. The vehicle wheel of claim 6, wherein the rough surface structure is a corrugated or serrated surface structure.

8. The vehicle wheel of claim 6, wherein a contact surface of the head section corresponding to the seat surface has a rough surface structure.

9. The vehicle wheel of claim 8, wherein the rough surface structure is a corrugated or serrated surface structure.

10. The vehicle wheel of claim 4, wherein a contact surface of the head section corresponding to the seat surface has a rough surface structure.

11. The vehicle wheel of claim 10, wherein the rough surface structure is a corrugated or serrated surface structure.

12. The vehicle wheel of claim 1, wherein the recess of the wheel disc is partially a radial extension of the joining channel.

13. The vehicle wheel of claim 1, wherein the elongated sleeve is of an annular cylindrical design.

14. The vehicle wheel of claim 1, wherein a section of the elongated sleeve that extends in the wheel rim and/or a section of the elongated sleeve that extends in the wheel disc is cohesively bonded and/or connected in a force-fit manner to the wheel rim or the wheel disc respectively.

15. The vehicle wheel of claim 1, wherein the wheel further comprises at least one a perforated disc that is arranged between an inner side of the wheel rim and a wheel attachment side of the wheel disc.

16. The vehicle wheel of claim 1, wherein the connecting element is a screw element, a threaded bolt or a press-in pin and/or wherein the wheel comprises more than one connecting element.

17. A vehicle wheel comprising:
a wheel rim;
a wheel disc; and
a connecting element connecting the wheel disc and the wheel rim, which connecting element is guided through a clearance hole of the wheel rim and joined in a joining channel of the wheel disc, wherein the joining channel is a blind hole in the wheel disc and the connecting element terminates within the joining channel, wherein the connecting element comprises a piston-like shaft section that has a radially extended cross section relative to a cross section of an end-side shaft section and at least partly extends into a recess of the clearance hole and of the joining channel of the wheel disc in a form-fit manner.

18. The vehicle wheel of claim 17, wherein the wheel further comprises a perforated disc which encompasses the piston-like shaft section and is disposed between and in contact with an inner side of the wheel rim and a wheel attachment side of the wheel disc.

19. The vehicle wheel of claim 17, wherein the end-side shaft section is joined in the joining channel by pressing in and/or gluing in.

20. A vehicle wheel comprising:
a wheel rim;
a wheel disc;
a connecting element that connects the wheel disc and the wheel rim, the connecting element extending through a clearance hole of the wheel rim and terminating within a joining channel of the wheel disc; and
an elongated sleeve that surrounds the connecting element coaxially, the elongated sleeve extending at least partially into a recess of the wheel rim and a recess of the wheel disc in a form-fit manner.

* * * * *